Oct. 19, 1954
G. A. MARMO
2,691,946
TOY VEHICLE
Filed Sept. 20, 1950
2 Sheets-Sheet 1
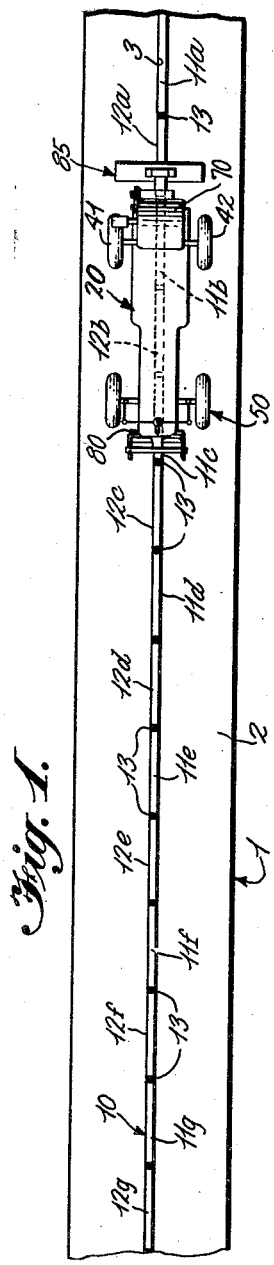
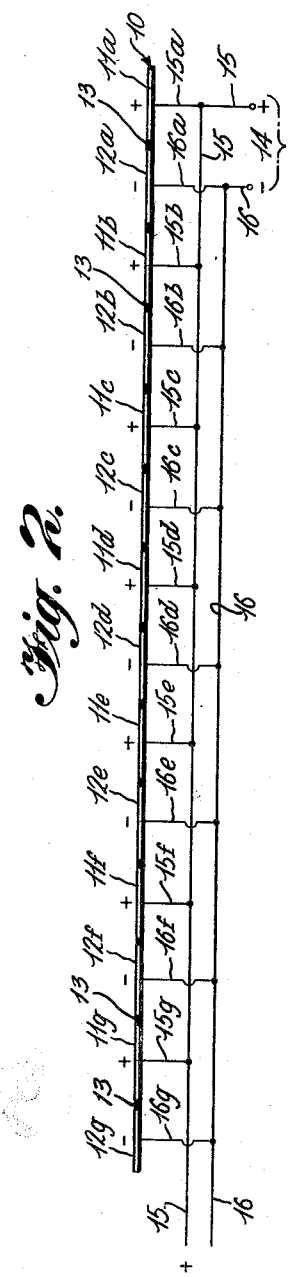
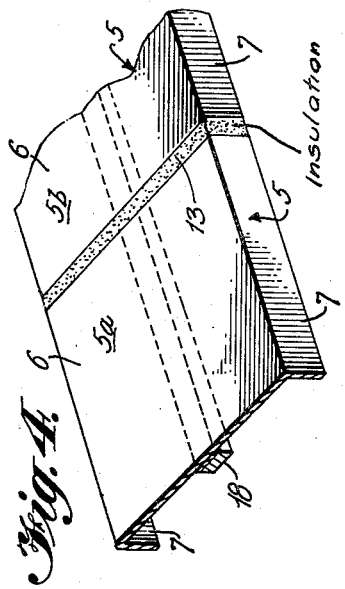
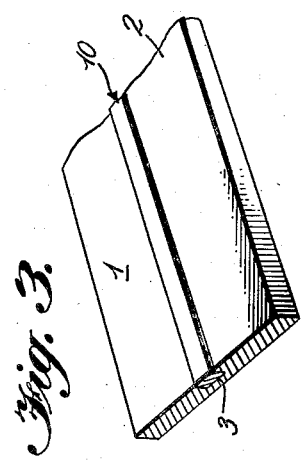
INVENTOR
*Generoso Marmo*
BY O'Boyle + Blair
Attorneys

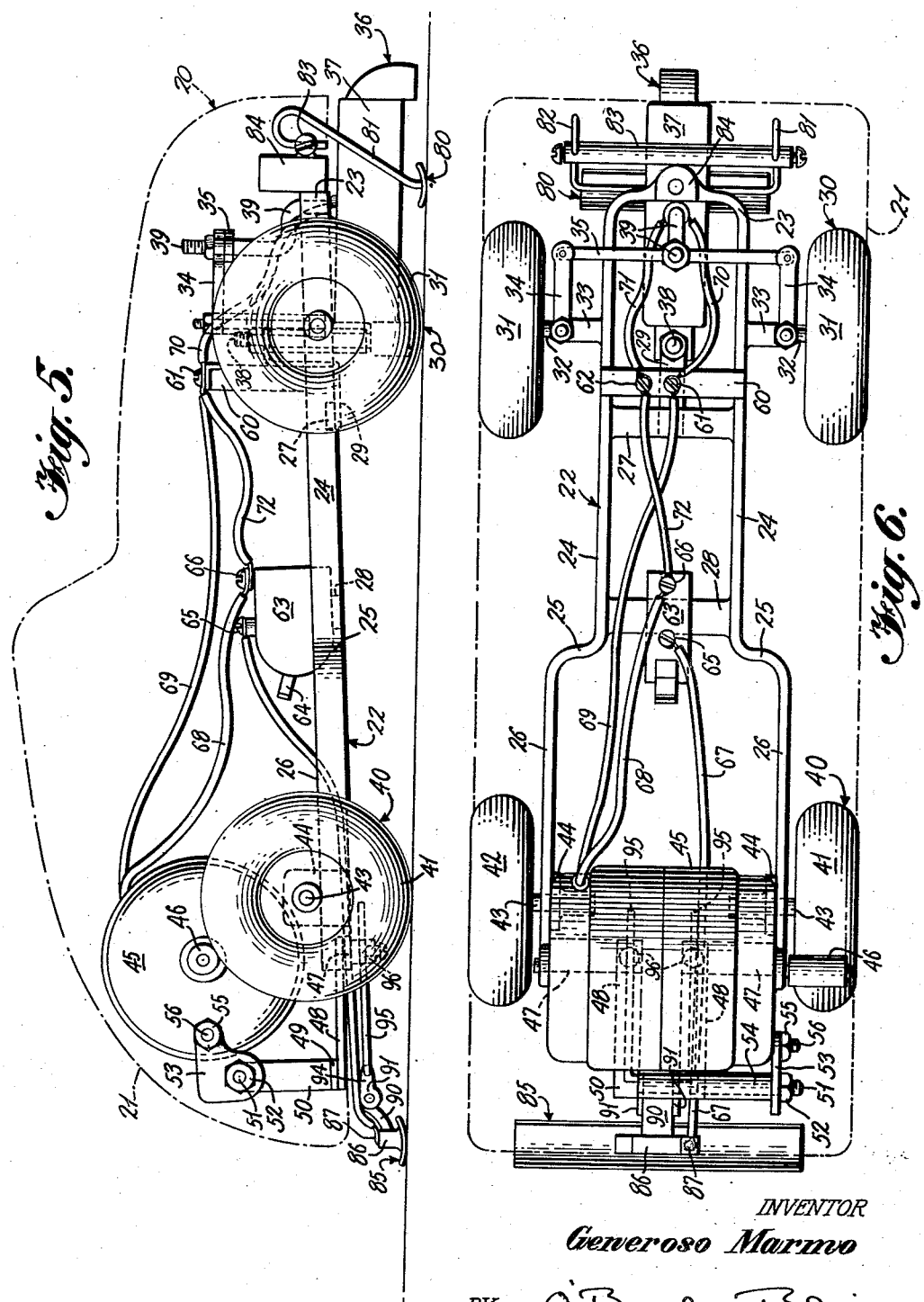

Patented Oct. 19, 1954

2,691,946

UNITED STATES PATENT OFFICE 2,691,946

TOY VEHICLE

Generoso A. Marmo, Moosic, Pa.

Application September 20, 1950, Serial No. 185,879

3 Claims. (Cl. 104—148)

This invention relates to toy electric automobiles and roadways therefor. Primarily, the invention relates to non-conductive roadways incorporating commutator type, straight line, segmented conductors of magnetizable materials and toy electric automobiles having current collectors engaging the conductor segments, and an electromagnet associated with the steering wheels and in magnetic relation with the said conductor segments, whereby the vehicle is automatically steered and caused to follow the said magnetic track. The invention also relates to the use of segmented, metallic, non-magnetic roadways incorporating subjoined, continuous guiding members of magnetizable materials.

Hitherto, toy electric automobiles have been used with conductive roadways mounting wire conductors set in central grooves, the conductors being insulated from the grooves and having exposed upper surfaces for engagement by current collecting wheels mounted on the bodies of the automobiles, one of the rear wheels of which is in conductive bearing engagement with the conductive surface of the roadway. Non-conductive wheels mounted on the front trucks engage the grooves and serve to steer the automobiles. Other toy automobiles are provided with magnets which are magnetically coupled to belt-mounted magnets underneath the roadways, the automobiles being carried along by the magnetic attraction of the moving belt-mounted magnets. To prevent the automobile from turning around or steering away from the path of the roadway magnets, one side of the roadway is formed with a raised guide rail section, and the roadway magnets are so arranged as to bias the car wheels against the guide rails when magnetically coupled to the car magnets.

Both the current-actuated, and the magnetically attracted cars require special constructions and installations which detract from the simplicity of the car structures and their operation.

I have found that the advantages of these hitherto mutually exclusive types of toy automobiles can be combined in novel current-driven and magnetically steered cars operating on non-magnetic roadways incorporating spaced bars serving as commutator elements of a current supply, alternate commutator segments being respectively connected to common leads of a suitable current source. Where an insulated roadway, of wood, or plastic, is used, the commutator segments will be set in a longitudinal groove. When a segmented non-magnetic, conductive roadway, of brass, or the like, is used, a continuous, magnetically responsive guide bar of soft iron, or the like, will be mounted on the under surface of the roadway.

It is a primary object of my invention to provide a toy electric motor driven automobile adapt to run on an insulated, non-metallic roadway incorporating a unitary, commutator type current supply for the motor, as well as run on a segmented, non-magnetic, metallic roadway having a unitary guide member of magnetizable material subjoined thereto.

It is also an object of my invention to provide a toy automobile of the character described and an associated roadway incorporating a unitary, segmented current supply means of conductive, magnetizable material adapted to effect simultaneous energizing of the driving motor and guiding and steering of the automobile.

A further object of my invention is the provision of a toy automobile and roadway of the character described in which the roadway has a plane road surface over which the wheels of the automobile travel in the usual manner of automobiles and in which the automobile is steered and guided from magnetizable, segmented, electric conductor means associated with the plane road surface.

Yet another object of my invention is the provision of a toy electric motor and a roadway of suitable configuration, the automobile having means adapted to pick up electric current from the roadway and magnetically effect guiding and steering of the automobile.

Another object of my invention is the provision of a special commutator type, segmented electric conductor of spaced, magnetic conductor elements, a current source, and leads severally connecting alternate conductor elements in parallel.

The above and other desirable objects and features of novelty and advantage of the present invention will be described in the accompanying specification and illustrated in the drawings, certain preferred embodiments of the invention being shown by way of illustration only, as the invention is not intended to be limited to the forms shown, except as such limitations are clearly imposed by the appended claims.

In the drawings, like numerals refer to similar parts throughout the several views, of which Fig. 1 is a plan view of a section of a roadway with a segmented, commutator type, central conductor of magnetizable, electrically conductive elements, and a toy electric motor driven automobile mounted thereon;

Fig. 2 is a circuit diagram of the electrical connection of the segmented conductor of Fig. 1;

Fig. 3 is a fragmentary detail of the roadway of Fig. 1, showing the mounting of a segmented conductor element in the surface of a wooden roadway;

Fig. 4 is a view similar to Fig. 3, showing a section of segmented, non-magnetic, conductive roadway with a subjoined magnetically responsive guide element;

Fig. 5 is a side elevation of the frame of a toy automobile showing the electric motor, steering magnet, current collectors, and internal wiring, the body being shown in phantom view, and Fig. 6 is a plan view of the chassis structure of Fig. 5, with the body removed.

Turning now to the showings of Figs. 1–3, the preferred form of the novel roadway and its associated conductor will be described. The roadway 1 is made of wood, wood composition, laminated wood or fabric, extruded or cast plastic sections, or any suitable insulating structural material including sheet asbestos, phenolic condensation products, and the like. The roadway may have any desired configuration: straight-away; oval; figure 8; circular; butterfly, or any simple or compound road section. The completed roadway will comprise fitted sections, not shown, arranged to simulate any desired road structure. The roadway, as shown, will be of rectangular cross-section, with a plane top surface 2, which is routed along its longitudinal center to form a groove 3. A segmented conductor, designated generally by the numeral 10, is comprised of alternate segments 11, 12, severally fitted, in drive fit, in the groove 3, and having their upper surfaces extending slightly above the surface 11, of the roadway. The segments 11, 12, may be uniformly spaced by spacers 13, of any suitable insulating material, such as wood or plastic, or they may be formed of cast plastic or hardenable wood base plastic fillers. The segments 11, 12 are serially designated 11a to 11g, and 12a to 12g, respectively. The alternate individual segments are connected in parallel, as shown in Fig. 2, to a suitable power input 14 through positive lead 15, and negative lead 16, with the individual connections from the segments to the leads being designated 15a to 15g, and 16a to 16g, respectively. The connections 15a–15g, and 16a–16g, are secured to the conductor segments in any suitable manner, well-known to those skilled in the art, and are not detailed here, as no invention is predicated upon their particular details in the system herein.

In the form of roadway shown in Fig. 4, a plane road surface is formed by the upper surfaces 6 of a plurality of inverted channel-shaped segments 5, of non-magnetic metal, such as sheet brass, copper, or the like. These segments have depending sides 7, and are spacedly secured on and joined by a continuous magnetically responsive metal guide bar 18, which is suitably insulated from the under surface of the members 5. The gaps or spaces 8, between the roadway members are desirably filled with suitable filler pieces, not shown, to provide a continuous plane roadway surface. Alternate roadway segments 5a, 5b, are severally connected to the current leads in the same way as the segments of the composite conductor.

The toy motor driven automobile used in connection with the novel roadways hereinabove described is shown in operative position on the roadway 1, of Fig. 1, and in detail in Figs. 5 and 6.

The toy automobile is designated generally by the numeral 20, and comprises the usual chassis 21 mounted on a body frame 22, which is supported by the front wheel assembly 30, and rear wheel assembly 40. The frame comprises a continuous metal bar bent on itself to form a front yoke or U section 23 having rearwardly extending, parallel legs 24, stepped laterally at 25, and terminating in open-ended, parallel frame members 26. The frame sections 24, are cross-braced by cross bars 27, 28, severally secured to the frame by welding or brazing. A bracket arm 29 is fixedly secured to the cross bar 27, as by welding or brazing, and extends forwardly and upwardly in the central longitudinal axis of the frame.

The front wheel assembly 30, comprises front wheels 31 mounted on axles 32 rotatably secured to aligned stub shafts 33 which are welded or otherwise fixedly secured to frame sections 24. Steering knuckles 34 are rigidly secured to axles 32, for rotation therewith, and are pivotally connected at their free ends by cross-bar or steering arm 35. The steering arm is actuated by an inverted, flat U-shaped electromagnet 36, having a winding 37. The magnet is pivotally mounted at its rear end on pin 38 secured in bracket 29, the mounting being such as to maintain the magnet horizontal, with the pole pieces clearing the ground. A guide pin 39, having a forward offset secured to the magnet, is journaled in the center of steering arm 35, and reciprocates the latter in response to the swing of the magnet about its pivot.

The rear wheel assembly 40, comprises the usual wheels 41, 42, mounted on axle 43, which is rotatably journaled in aligned bearings 44 on the inner faces of frame sections 26 adjacent the ends thereof. Wheel 41 is fast with axle 43 and rotatable therewith, while wheel 42 is freely rotatable on the axle. The wheel 41 is driven by friction bearing wheel 46 of universal type driving motor 45. The motor 45 is mounted for driving bearing engagement with wheel 41 in the following manner: A platform support comprises a pair of inwardly extending arms 47 secured to the ends of frame members 26, and rigid therewith. A second pair of parallel arms 48 are secured to the inner ends of arms 47, at right angles thereto, and extend rearwardly beyond the motor 45, being spacedly secured at their free ends by cross bar 49. The bar 49 serves as a mounting for post member 50. A horizontal rod 51 is rigidly secured to the upper end of post 50 and extends outwardly towards the driven wheel 41. The rod 51 is threaded at its free end to receive nut 52. A bracket plate 53 is welded or brazed to a sleeve 54, and is adjustably secured to the casing of motor 45, by nut 55 threaded on stud 56, which is screwed into the motor casing. The motor is mounted in bearing driving engagement with drive wheel 41 by fitting bearing sleeve 54 on and over bearing arm 51 and securing it in place by threading nut 52 on the end of arm 51. With this arrangement, the motor 45 is eccentrically mounted on the bearing arm 51, and its dead weight will force the friction driving wheel 46 into constant, yielding, driving engagement with the thread of driving wheel 41.

The electrical system of the toy motor driven automobile will now be described: An insulating panel 60 is secured across plane members 24, being riveted or otherwise fastened to bracket 29. The panel mounts a pair of angular connectors 61, 62, having the usual screw fasteners. Connector 61 is in good electrical and mechanical contact with the bracket 29 and serves as a ground terminal. A combination rheostat-switch 63 is secured on cross bar 28. This member has a multi-position switch 64 which is movable from an "off" position to full "on" position permitting several motor speeds to be attained, as will be described more in detail hereinafter. The rheostat is provided with screw terminals 65, 66. A front collector shoe 80 is grounded to the frame of the automobile, terminal 61 serving as a connection therefor. The second rear collector shoe 85 is connected to contact 65 of the rheostat 63 by insulated wire connection 67. A second connection 68 connects the rheostat 63 with motor 45. Line 69 connects the motor 45 with the ground terminal 61. Lines 70, 71 respectively connect the winding 37 of electromagnet 36 with terminals 61, 62. A jump connector 72 bridges contacts or terminals 62-66. Assuming current to be picked up by the front collector shoe, current will flow from terminal 61 through line 69 to motor 45 and return by line 68 to rheostat 63 (terminal 66) and return through line 67 to the rear collector shoe.

As will be seen from the showings of Figs. 1 and 2, the current from input 14 will flow through positive line 15 to a contact shoe where it is picked up by the front collector, passing through the motor circuit of the car and returning through the rear collector shoe and a conductor segment of opposite polarity to negative side 16 of the current input. While the current is flowing through the motor, branch current is flowing through the coil of the electromagnet, energizing the same. Here the flow will be from terminal 66 through the rheostat 63 to return line 67 and the rear collector shoe. With the electromagnet energized and power flowing through the motor, the steering mechanism of the front wheels will automatically follow the path determined by the magnetically responsive commutator elements of conductor 10, no matter what configuration the conductor path may be caused to assume. The front and rear conductor shoes are held in positive conductive bearing engagement against the conductor segments in the following manner: The front collector mechanism comprises a front shoe 80 which is a slightly curved metal strip supported transversely of the front of the car by conductive spring arms 81, 82, respectively. These arms are secured at the ends of a conductive cross arm 83, which is integral with boss 84. Boss 84 is welded or otherwise conductively secured to the front yoke or cross arm 23 of the car frame 22. The spring arms 81, 82 are so configured and arranged as to insure a positive downward spring bias on collector shoe 80 thereby effecting positive bearing engagement of the latter with the exposed surfaces of the conductor elements of the composite conductor 10, mounted in roadway 1. The rear collector shoe 85 is provided with the simple bridge member 86 which receives the tip end of an insulating carrier 90. Line 67 has one end conductively secured to collector 85, in any suitable manner, as by welding or brazing or mechanically, or as designated generally by the numeral 87. The inner end of the insulating carrier 90 is fixedly secured between extending fingers 91 of bracket 94 which is carried on the ends of spring wires or fingers 95. The fingers 95 are adjustably secured in screw threaded terminal post 96, depending from segments 47, 47 of the support for the motor mounting 50. The fingers 95 can be adjusted forwardly or rearwardly to impose any desired spring bias-ing pressure on the transversely disposed collector shoe 85.

It will now be appreciated that there has been provided a novel toy motor driven automobile with cooperating roadways adapted to supply current to the motor while simultaneously electromagnetically steering the automobile along any path determined by the structure of the roadway. The invention has been shown to include an external current source transmitted to the moving automobile through a segmented, commutator type conductor, the segments of which being of magnetically responsive material, serve to attract the electromagnet coupled to the steering mechanism of the automobile, whereby automatic steering is effected. The toy automobile is provided with special collector shoes bridging conductor segments of opposite polarity and the electrical system of the automobile includes pre-set rheostat means enabling a positive control of the maximum speed of the automobile. Additionally, rheostat means may be incorporated in the external electrical supply circuit whereby the speed of the car can be controlled while it is in motion. The mounting of the conductor segments and their length is so arranged that the collector shoes 80 and 85 are at all times in conductive engagement with segments of opposite polarity, thereby insuring continuous current flow to the motor no matter what the position of the car.

It will be further appreciated that in lieu of using an electromagnet, associated with the steering wheels of the vehicle, that a permanent magnet may be substituted therefor. While, for purposes of illustration, a toy electric automobile has been described, it will be understood that the invention comprehends the use of other devices or vehicles adapted to run on the novel improved roadway of the present invention.

While I have shown and described the preferred embodiment of my invention, I wish it to be understood that I do not confine myself to the precise details of construction herein set forth, by way of illustration, as it is apparent that many changes and variations may be made therein by those skilled in the art, without departing from the spirit of the invention or exceeding the scope of the appended claims.

I claim:

1. The combination with a toy automobile having a pair of front wheels, including steering mechanism, and a pair of rear wheels, of an electric motor for driving said automobile, a roadway, a segmented conductor carried by the roadway and insulated therefrom, a source of electric current, conductors leading from said source of electric current to the said segments whereby respectively adjacent segments carry current of opposite polarity, a pair of collector shoes mounted on the automobile and spaced to contact conductor segments of opposite polarity at all times, means for connecting the driving motor in circuit with the said collectors, and magnetic means connected to the steering mechanism of the front wheels and sequentially oriented by the said conductor segments, the said segments being of magnetically responsive material.

2. The combination with a toy automobile having a pair of front wheels, including steering mechanism, and a pair of rear wheels, of an electric motor for driving said automobile, a roadway, a segmented conductor comprised of magnetically responsive metal segments extending slightly above the surface of the roadway, a source of electric current, conductors leading from said source of electric current to the said segments whereby respectively adjacent segments carry current of opposite polarity, a pair of collector shoes mounted on the automobile and spaced to contact conductor segments of opposite polarity at all times, means for connecting the motor in circuit with the said collectors, and electromagnetic means connected to the steering mechanism of the front wheels and sequentially oriented by the said conductor segments, the said segments being of magnetically responsive material.

3. The combination with a toy vehicle having a front wheel, including steering mechanism, and a pair of rear wheels, of an electric motor for driving the rear wheels of the vehicle, a roadway, a segmented conductor carried by the roadway and insulated therefrom, a source of electric current conductors leading from said source to the segments of the conductor carried by the roadway whereby respectively adjacent segments carry current of opposite polarity, a pair of collector shoes mounted on the vehicle, said shoes being spaced to contact conductor segments of opposite polarity at all times, means for connecting the driving motor in circuit with said collectors, and magnetic means connected to the steering mechanism of the front wheel of the vehicle and sequentially oriented by the conductor segments, said segments being of magnetic responsive material.

References Cited in the file of this patent

UNITED STATES PATENTS

| Number | Name | Date |
|---|---|---|
| 434,871 | Hunter | Aug. 19, 1890 |
| 521,891 | Reed | June 26, 1894 |
| 2,239,395 | Mallory | Apr. 22, 1941 |
| 2,493,755 | Ferrill | Jan. 10, 1950 |